(12) United States Patent
Hilleary

(10) Patent No.: US 8,596,587 B2
(45) Date of Patent: Dec. 3, 2013

(54) SYSTEMS AND METHODS FOR REDUNDANT VEHICLE DETECTION AT HIGHWAY-RAIL GRADE CROSSINGS

(75) Inventor: Thomas N. Hilleary, Kansas City, MO (US)

(73) Assignee: Bystep, LLC, Kansas City, MO (US)

( * ) Notice: Subject to any disclaimer, the term of this patent is extended or adjusted under 35 U.S.C. 154(b) by 231 days.

(21) Appl. No.: 13/103,625

(22) Filed: May 9, 2011

(65) Prior Publication Data

US 2012/0286103 A1 Nov. 15, 2012

(51) Int. Cl.
*B61L 29/00* (2006.01)
(52) U.S. Cl.
USPC .......................... 246/125; 246/111; 342/173
(58) Field of Classification Search
USPC ................. 246/125, 111, 113, 114 R, 473.1; 340/903; 342/173, 165, 174
See application file for complete search history.

(56) References Cited

U.S. PATENT DOCUMENTS

| | | | |
|---|---|---|---|
| 5,890,682 A * | 4/1999 | Welk | 246/125 |
| 6,195,020 B1 * | 2/2001 | Brodeur et al. | 340/933 |
| 6,340,139 B1 | 1/2002 | Hilleary | |
| 6,641,091 B1 | 11/2003 | Hilleary | |
| 6,933,858 B2 | 8/2005 | Pieralli | |
| 7,295,111 B2 | 11/2007 | Pieralli | |
| 7,439,876 B2 | 10/2008 | Pieralli et al. | |
| 7,573,400 B2 * | 8/2009 | Arnold et al. | 340/907 |
| 7,715,276 B2 * | 5/2010 | Agam et al. | 367/96 |
| 8,054,197 B1 * | 11/2011 | Martin et al. | 340/815.44 |
| 2002/0185571 A1 * | 12/2002 | Bryant et al. | 246/125 |
| 2008/0136632 A1 | 6/2008 | Pieralli | |

* cited by examiner

Primary Examiner — Zachary Kuhfuss
(74) Attorney, Agent, or Firm — Armstrong Teasdale LLP

(57) ABSTRACT

A method for sensing objects within a rail grade crossing island is described. The method includes transmitting a radar signal into the island from each of a plurality of radar devices such that each portion of the island is monitored by at least two of the radar devices, detecting if an object is in the island based on received signals corresponding to the transmissions associated with at least one of the radar devices, and operating a gate control device associated with the rail grade crossing based on the detections.

20 Claims, 6 Drawing Sheets

SYSTEMS AND METHODS FOR REDUNDANT VEHICLE DETECTION AT HIGHWAY-RAIL GRADE CROSSINGS

BACKGROUND

The field of the disclosure relates generally to operation of gates at grade crossings, and more specifically, to systems and methods for vehicle detection at island crossings.

Train traffic in North America typically intersects with public streets and highways at rail grade crossings. At such crossings, active and/or passive warning systems provide a notification to automotive traffic regarding the impending arrival of a train. The particular notifications provided are somewhat dependent on the street or highway intersecting the rail line. For example, where average train speeds or automotive traffic volume warrants, active warning systems are deployed which may include one or more of flashing lights, bells, and barrier gates. As high speed rail infrastructure is expanded to promote high-speed intercity passenger service, more attention is being paid to the performance of these warning systems.

While the active warning systems are effective, risks persist. One such risk is that associated with the instance of vehicles that are found within the crossing island, which is the area between barrier gates where the rails are located. Such vehicles may be accidently or deliberately placed in such crossing islands. For example, a vehicle may become disabled while within the crossing island. Instances have occurred where automobile drivers have driven around the barrier gates only to find themselves trapped within the crossing island.

High mass freight trains, at speeds of 55 miles per hour and greater take thousands of meters to halt, a situation that becomes more perilous with a current emphasis on development of high-speed rail traffic (80-110 MPH (grade separation is required above 110 MPH)). At such speeds, locomotive operators and engineers have insufficient time to halt the train if such an obstruction such as a disabled vehicle is visually identified at an upcoming crossing.

As mentioned above, active railroad crossing warning systems typically utilize barrier gates and flashing warning lights. A key objective of the North American high speed rail initiative is increasingly higher speed rail traffic in a mixed operating environment with conventional freight equipment and service, in many cases in double and triple track corridors. At the majority of the 60,000+ active railroad crossings within the U.S., railroads have typically utilized two quadrant gate warning systems—comprised of entrance gates in front of traffic entering the crossing 'island' but with no exit gate so that any vehicles entering or within the crossing island when the gates start to descend have a clear and unobstructed exit path.

With the advent of higher speed locomotives, especially those traveling at 80-110 MPH, it is necessary to utilize four gates—two entrance gates augmented by two exit gates—to completely seal the corridor during train movement across the crossing. While the 'fail-safe' position of entrance gates is in the lowered position, the fail-safe position of the exit gates is typically in the raised position to prevent any vehicles from being trapped in the crossing island when the crossing is activated and the roadways are closed off.

Initially, exit gates were programmed to delay several seconds before descending, allowing an arbitrary time period for any vehicles on the island to exit the crossing. Such a system is sometimes referred to as Timed Exit Gate Operating Mode or Timed EGOM. However, studies have since shown that it is necessary to detect vehicles in the crossing to maximize safety. With vehicle presence detection, exit gate descent is delayed until it can be verified that all vehicles have cleared the crossing, and a particular exit gate may be raised (or stay raised) if it can be determined that a vehicle is in the island in a corresponding lane of traffic. This type of system is sometimes referred to as a Dynamic Exit Gate Operating Mode or Dynamic EGOM).

The primary vehicle detection technology accepted for use today is a sub-surface inductive loop array, with a proven reliability as illustrated by its popularity in traffic intersection controls. Continuity verification and periodic check loop tests are utilized to provide an indication, although not comprehensive verification of loop array operation and performance. A failure of one or more loops in a crossing island implementation typically informs an exit gate controller system, causing it to revert to a simplistic time delay mode of operation that incurs a safety risk for high-speed rail environments. While buried inductive loops are effective at detecting the metallic content of vehicles entering an intersection or railroad-crossing island, certain drawbacks have compelled railroad organizations to seek alternative solutions, including the following:

For example, repair of sub-surface inductive loop systems is problematic and time consuming, requiring coordination by both the railroad and local highway maintenance organizations. Installation or repair of loops in a highway-rail grade crossing island is disruptive to both vehicular and railroad traffic requiring that trains slow to a safe speed or in some cases stop and post a flagman prior to passing through the crossing. In high-density urban freight corridors where there may be in excess of 100 trains per day, the financial and congestion consequences (for both vehicular and railroad traffic) are intolerable.

Inductive loop arrays are not fully adequate for triple track sites where internal track spacing complicates installation and reduces the size of detection zones within the crossing island. The restricted space allowable for inductive loops, especially between adjacent tracks, has the consequence of lessening the sensitivity of the loop. A function of the physics associated with inductive loop detection, the detection height of a loop is $2/3$ of the length of the shortest side of the rectangular loop. Therefore, since space between tracks restricts the loops' short side dimension, there is a corresponding decrease in detection height and sensitivity. This drawback is exacerbated when pre-formed concrete or composite panels are used as a crossing roadbed, because of the limited rectangular area available for inductive loop installation.

Further inductive loops lack an inherent capability for in-service functional checks or any means of active redundancy. Because of the magnetic principals involved, loop systems cannot include redundant, concentrically arranged loops. Therefore, two redundant systems cannot be constantly compared for identical response, which would provide constant, in service performance verification. Instead, loop systems typically employ 'check loops' which are buried alongside the primary detection loops and which are briefly excited at programmable intervals (from one to 200 or more minutes) with a frequency that can be picked up by the detection loop. In actuality, check loops only verify detector loop continuity and only imply an ability to detect a vehicle passing overhead, and lack any means of quantitatively evaluating detection loop sensitivity or signal to noise immunity. A failed check loop sequence can be the result of a failed detector loop or a failed check clip and therefore is somewhat ambiguous.

A number of different technologies and methods have been used for vehicle detection, with varying degrees of success.

While some applications can justify the relative lack of reliability these detection methods achieve (for instance, parking lot gates and traffic light violation detection), they do not qualify for the safety critical requirements of railroad crossing.

Video image processing is one such technology. For example, a video camera and sophisticated image processing can locate vehicles in a real time image using video processing, or analytics. Video systems are costly relative to loop and the radar technologies, but their greatest drawback is poor performance in low light, very bright light, and during inclement weather where rain, snow, and fog can limit visibility. Video processors are not regarded as a sufficiently reliable or cost-effective detection technology to influence the behavior of railroad crossing warning systems.

Doppler microwave detectors are continuous wave (CW) Doppler devices that transmit bursts of energy at a fixed frequency between 1 and 40 GHz. When a vehicle passes through this signal a portion is reflected back to the emitter, slightly shifting the frequency based on the vehicle's speed (Doppler shift). CW microwave radars are therefore only able to detect vehicles that are moving. In addition, the majority of microwave radars utilize a single beam, which is aimed and directed by way of a physical antenna "horn" that focuses the detection beam on the area of interest. To cover the large rectangular detection area presented by a typical railroad crossing would require electronic or mechanical steering of the beam or the use of multiple single beam radars operating in concert and configured to prevent cross-radar interference. While technically feasible the life-cycle cost and maintenance of electronic or mechanically steered radars is not practical for railroad crossing applications. This is also the case with Ultra Wide Band, Micropower Impulse Radar approaches.

Infrared detectors are most commonly used in commercial and residential security systems. Active IR illuminates a detection zone with low power infrared energy (just above visible light spectrum). Objects in the detection zone reflect the signal back where subsequent processing determines presence. Passive IR relies on changes in the thermal content of the detection zone, caused by objects that are warmer or cooler, from an infrared wavelength perspective, than the surrounding area. Several disadvantages of infrared detectors are often cited. With active devices, atmospheric effects may cause scatter of the transmitted beam and received energy. Glint from sunlight may cause unwanted and confusing signals. With respect to weather, the amount of energy reaching the focal plane is sensitive to water from fog, haze, and rain, as well as to other obscurants such as smoke and dust. In addition to scattering, these environmental effects can absorb energy that would otherwise be detected by both active and passive infrared devices. As such, infrared technologies are not considered a sufficiently viable detection technology to influence the behavior of railroad crossing warning systems.

Ultrasonic vehicle detectors can be configured to receive range and Doppler speed data, the same concept used by the radar detectors, but at a much lower frequency and issued as sound waves rather than radio waves. Ultrasonic detectors transmit sound waves, at a selected frequency between 20 and 65 kHz, from overhead transducers into an area defined by the transmitter's beam width pattern. A portion of the energy is backscattered or reflected from the road surface or a vehicle in the field of view. While useful for measuring tank levels and other closed environment sensing, ultrasonic sensors have not delivered sufficiently reliability to qualify for railroad crossing use due to limited range and interference from ambient noise sources.

With regard to passive acoustical detector arrays, vehicles produce acoustic energy or audible sounds from a variety of sources within each vehicle and from the interaction of the vehicle's tires with the road. Although unintentional, the radiated sound acts as a beacon signal containing information that can be extracted by roadside acoustic energy detectors. Arrays of passive acoustic microphones can isolate and provide spatial directivity from which sounds are continuously detected and processed from a specific location along the roadway. However, the chaotic acoustical environment at a crossing and the wide array of vehicle signatures that must be adaptively classified and processed render this technology inadequate for a railroad crossing application.

Magnetic detectors indicate the presence of a metallic object by the disruption it causes in an induced or natural magnetic field. These detectors may be active devices (magnetometers), or passive devices (magnetic detectors). Individual magnetometer cylinders must be buried a numerous locations in the detection area. They are powered by batteries and signal presence detection to a nearby collector receiving signals from the entire sensor array. The complexity of the local area wireless network, intrusive installation labor, and the need to periodically replace batteries makes this technology unsuitable. In addition it has been found that the considerable magnetic mass of a locomotive creates a magnetic 'memory', degrading the sensors' sensitivity for periods of time after a train has passed the detection zone.

BRIEF DESCRIPTION

In one aspect, a method for sensing objects within a rail grade crossing island is provided. The method includes transmitting a radar signal into the island from each of a plurality of radar devices such that each portion of the island is monitored by at least two of the radar devices, detecting if an object is in the island based on received signals corresponding to the transmissions associated with at least one of the radar devices, and operating a gate control device associated with the rail grade crossing based on the detections.

In another aspect, a crossing gate control system for a rail grade crossing island is provided. The system includes at least two radar sensors comprising a plurality of radar devices therein, the radar sensors positioned such that each portion of the crossing island is monitored by at least two of the radar devices, a processing device configured to receive signals from the at least two radar sensors, and a railroad equipment interface communicatively coupled to the processing device and further coupled to one or more relays for operation of crossing gates associated with the crossing island. The railroad equipment interface is operable to receive signals from the processing device related to operation of one or more relays to forestall or reverse exit crossing gate descent based on detection by one or more of the radar devices.

In still another aspect, a method of operating a radar sensor-based rail grade crossing is provided. The method includes detecting a train approaching the rail grade crossing, lowering the entrance gates to the crossing, based on a speed of the train and a distance of the train from the crossing, monitoring data from radar sensors to determine if any objects are within the rail grade crossing island after the entrance have been lowered, if objects are detected by the radar sensors, delay lowering of any exit gates until the radar sensors indicate an absence of objects within the crossing island, and if, after a predetermined time, the radar sensors indicate one or more objects are still within the crossing island, communicate existence of the one or more objects to railroad personnel.

In yet another aspect, a method for verifying operability of a plurality of radar sensors deployed for monitoring a portion of a rail grade crossing is provided. The method includes comparing co-incident detection signals from the plurality of radar sensors, and providing a notification if both radars do not detect the same objects in a programmable percentage of detections.

The features, functions, and advantages that have been discussed can be achieved independently in various embodiments or may be combined in yet other embodiments further details of which can be seen with reference to the following description and drawings.

DETAILED DESCRIPTION

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The embodiments described herein sense vehicles within and moving through a rail grade crossing island, and deliver signals to crossing gate controller devices to influence the position of exit gates when a vehicle is detected within the crossing island during a crossing activation. The embodiments incorporate microwave radar technologies. Specifically, radars with frequency modulated continuous wave (FMCW) emitted energy and featuring multiple radars integrated into a single package, and used in multiple, collaborative arrangements, overcome virtually all of the aforementioned drawbacks of prior approaches.

Figure 1:
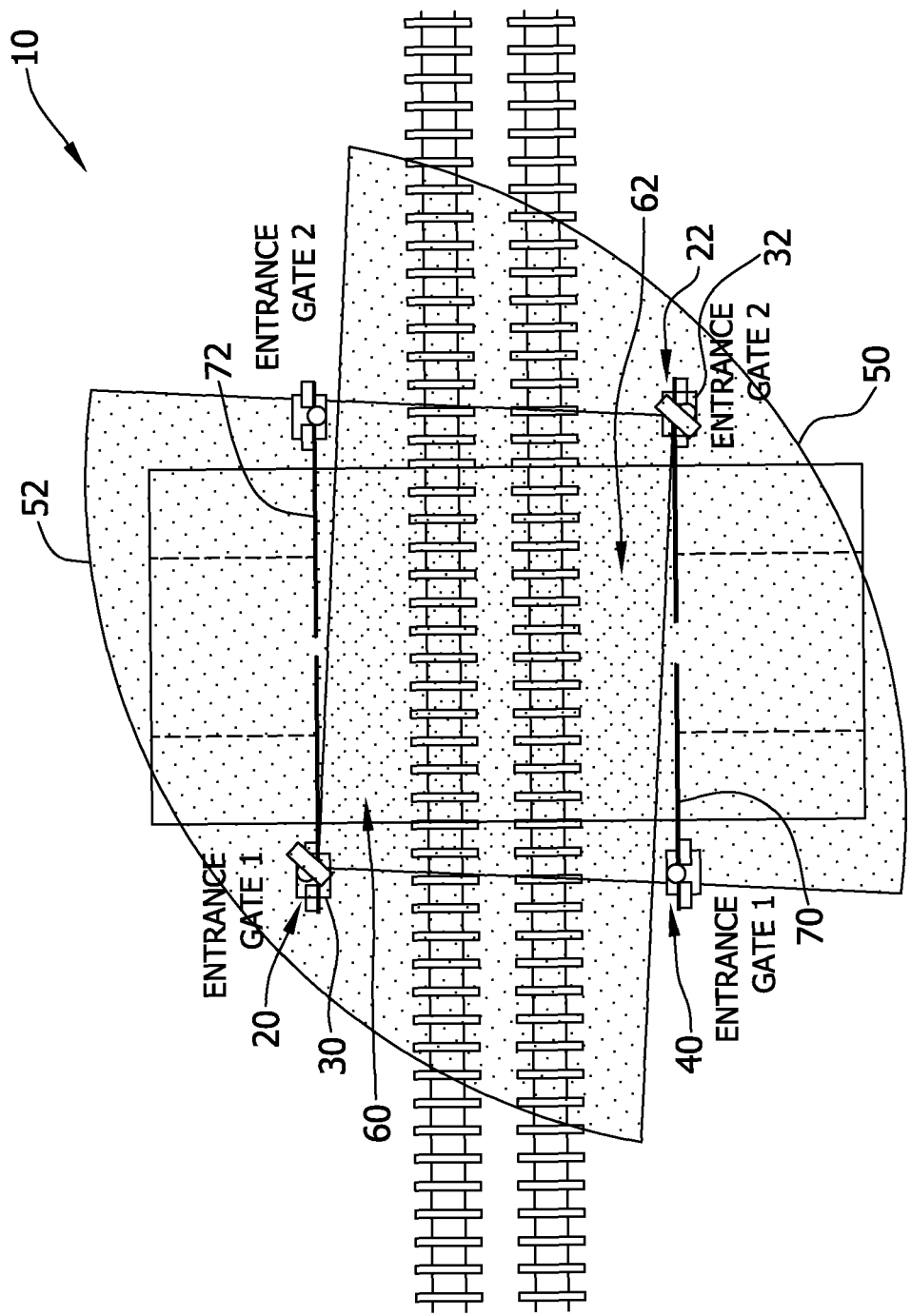
FIG. 1 is a depiction of a railroad grade crossing incorporating a plurality of radar sensors for detection of objects within the crossing.

FIG. 1 depicts a railroad grade crossing 10. In the illustrated embodiment, multiple FMCW radar sensors 20, 22 are mounted above and at the edge of the railroad grade crossing 10, for example, on top of the entrance gate mast 30, 32 or a similarly positioned, dedicated pole. As such, the radar sensors 20, 22 themselves are not embedded in the roadway and do not therefore suffer the life-shortening effects of temperature and pavement movement that break and geometrically distort the inductive loop sensor wires described above. By being installed outside of the crossing in this manner (e.g., not embedded in the roadway), the installation or replacement of the radar sensors 20, 22 do not require crossing roadwork and therefore avoid the severe consequences of loop and magnetometer installation which requires trains to slow considerably during construction phases. In one embodiment, the radar sensors operate at about 24 GHz.

The crossing island 40 is pictured in FIG. 1, showing the location of the two radar sensors 20, 22 atop the respective entrance gate mast poles 30, 32. Each radar sensor has a detection footprint that spans all lanes of the entire crossing. The detection footprint 50 is provided by radar sensor 20 and detection footprint 52 is provided by radar sensor 22. In one embodiment, detection zones 60, 62 are established within these detection footprints for a lane of traffic associated with each exit gate 70, 72. Both radar sensors 20, 22 have similar detection zones 60, 62 so that their detection events may be compared, both in use and as a system-level check.

In one embodiment, radar sensors 20, 22 each incorporate a plurality of radar devices. In one embodiment, each radar sensor 20, 22 incorporates 16 radar devices. Through the use of multiple radar device radar sensors, coverage of the entire crossing island 40 is provided, with at least two separate radar devices covering each square foot of the crossing island. Such a configuration is a distinct improvement over inductive loop sensors that have to be fit between adjacent tracks and as such have limited vehicle detection zone coverage areas.

In one embodiment, two or more radar sensors 20, 22 are incorporated into the island 40 each having multiple radar devices. Each radar device emits a uniquely encoded emitter signal, permitting multiple radar devices to monitor a given area without interference. In embodiments, detection outputs are logically OR'ed together, so a detection event from a single radar device is a valid detection state. Such a configuration results in a level of redundant operation that cannot be achieved by buried inductive loops and magnetometers.

In embodiments, each radar device provides a regular healthcheck signal, for example, to an external computing device, signifying that its internal circuitry is behaving nominally. A system processor associated with the external computing device is programmed to verify the regular issuance of healthcheck signals from each radar device in each radar sensor 20, 22. The system processor is further programmed to issue a healthcheck failure signal to a crossing gate controller associated with railroad grade crossing 10 if a healthcheck signal from one of the radar devices is no longer verified.

Figure 2:
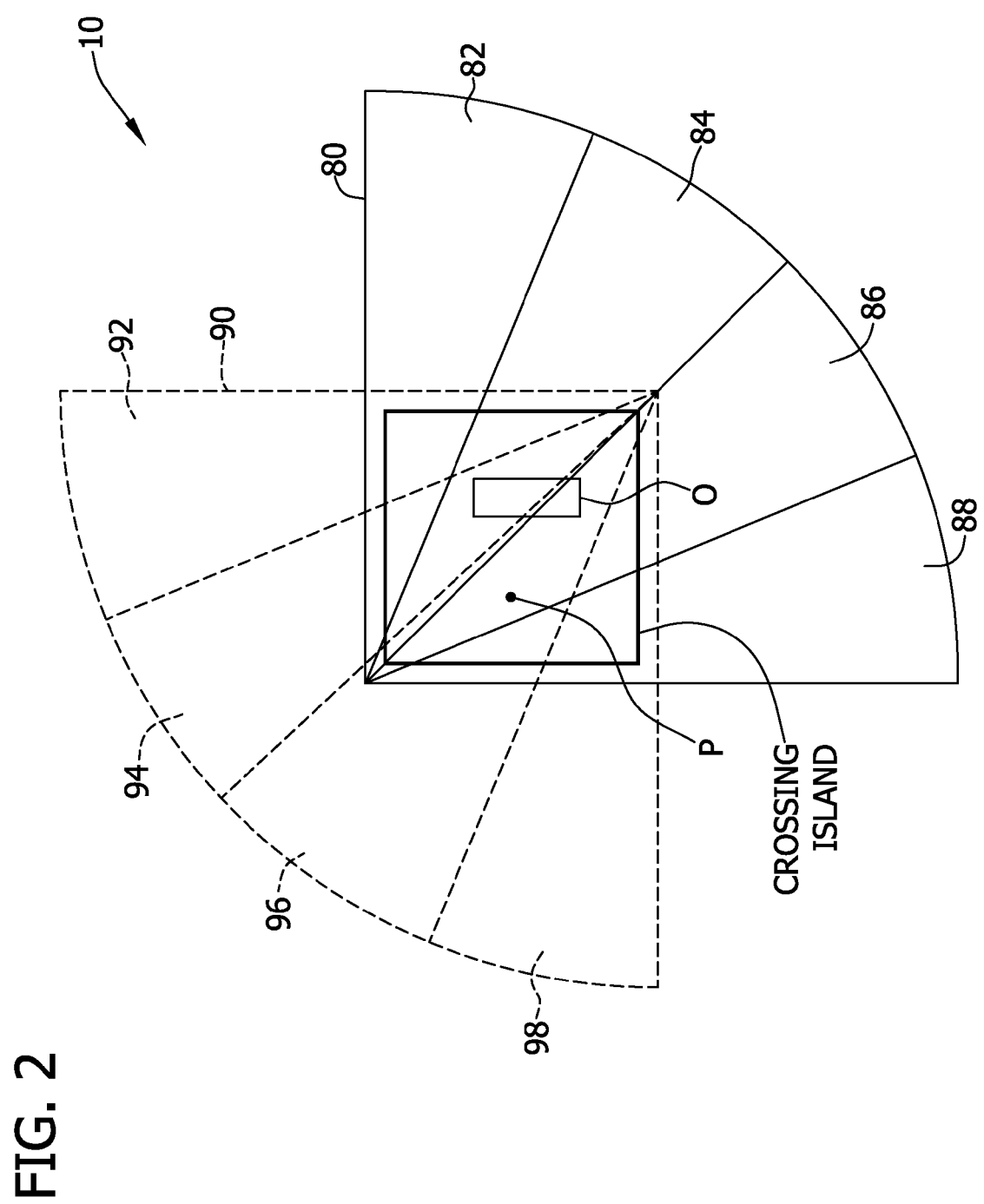
FIG. 2 is a depicting coverage areas of the individual radar devices associated with the radar sensors of FIG. 1.

FIG. 2 is a depicting coverage areas 80, 90 of the radar sensors 20, 22 of FIG. 1. As described herein, embodiments of radar sensors 20, 22 include multiple radar devices. In FIG. 2, coverage area 80 includes four individual radar device coverage areas 82, 84, 86, and 88, while coverage area 90 includes four individual radar device coverage areas 92, 94, 96, and 98. While FIG. 2 depicts the radar sensors 20, 22 as having four individual radar devices each, for drawing simplicity, embodiments of radar sensors 20, 22 that include more radar devices and fewer radar devices are known. In one exemplary embodiment, radar sensors 20, 22 each include 16 individual radar devices.

Those skilled in the art will appreciate that the radar coverage areas may have a shape that is different than is shown in FIG. 2. However, one purpose of FIG. 2 is to illustrate that in a rail grade crossing application, at least one radar device from each radar sensor 20, 22 will "cover" a defined area. For example, at a point "P" in the rail grade crossing, radar devices 86 and 96 are both operable for detecting any objects at or proximate point "P". As is easily understood, objects of sufficient size may be detected by multiple radar devices. For example, for an object "O" in the rail grade crossing area, radar devices 84, 86, 94 and 96 are all operable for detecting object O at its current position, and is referred to herein as "co-incident detection".

As described further herein, detection (e.g., a radar signature) of an object such as "O" is characterized differently by each of the individual radar devices 84, 86, 94 and 96 as each device is in a different position with respect to object "O". Though radar devices 84 and 86 are adjacent, their relative position with respect to "O" is slightly different, and as shown, different portions of "O" are detected by each device. As further described herein, comparison of co-incident detection signals from the plurality of radar sensors provides information as to the existence of an object within a rail grade crossing, and further provides data indicative of the operation of each radar device and/or radar sensor, As an example, if radar device 86 detects an object at point "P", radar device 96 should also detect the object, though the detection signals for each will be different due to their relative position with respect to "P". If, after compensating for the different relative position, the data from radar sensors 86 and 96 do not correlate, it may be an indication that one of the radar device is not working properly, again, as further described below. As such, active detection of objects within the crossing island also provides data as to the operational condition of the radar devices.

Figure 3:
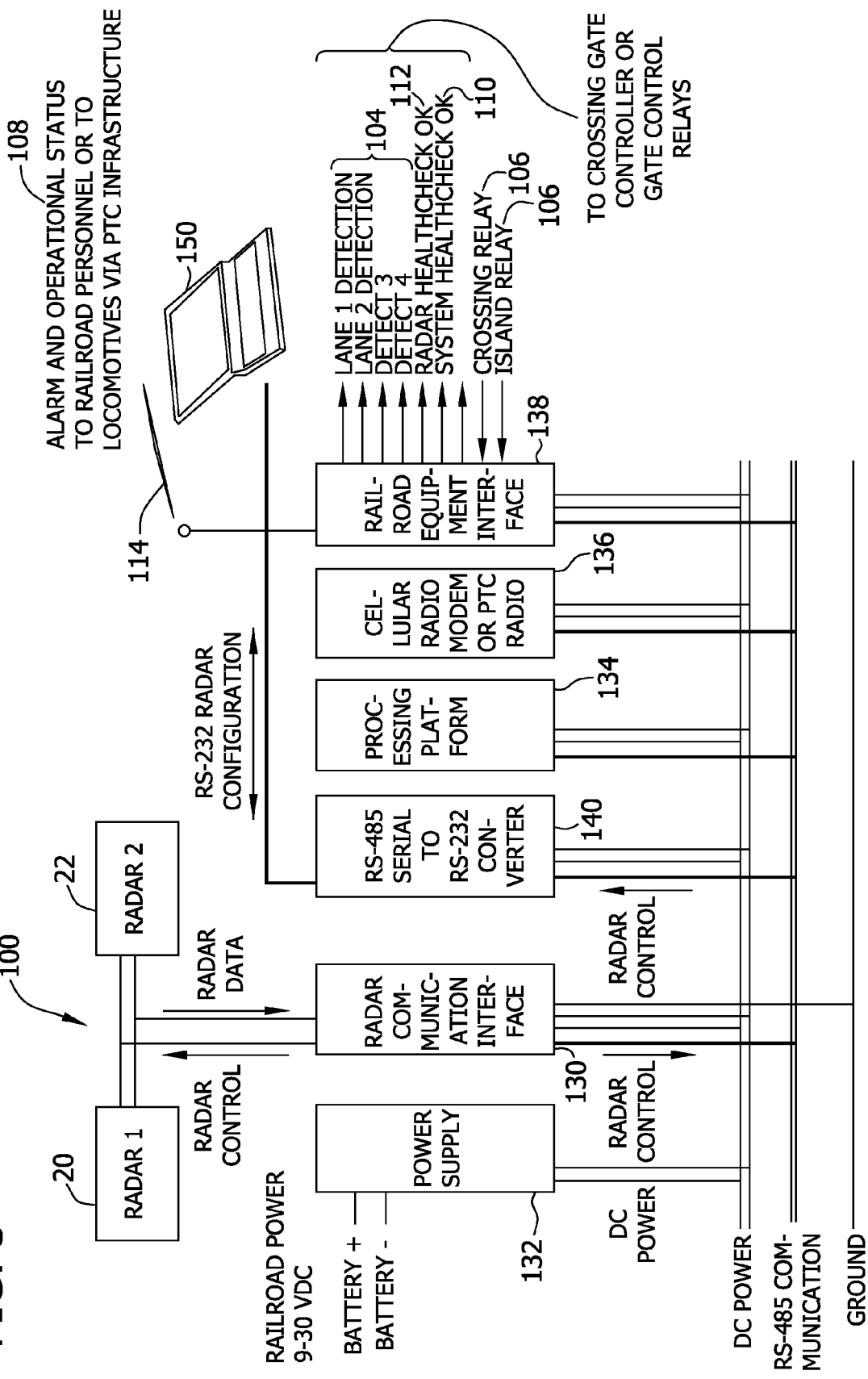
FIG. 3 is a block diagram of a system for operating the one or more radar sensors and grade crossing components described with respect to FIG. 1.

FIG. 3 is a block diagram of a radar monitoring system 100 operable for communications with radar sensors 20 and 22. In operation, radar monitoring system 100 receives the outputs of the multiple radar devices associated with radar sensors 20, 22. In one embodiment, radar monitoring system 100 is programmed to expect at least one radar device from each of the sensors to sense the same vehicles, but from different physical perspectives (with allowances for low probability instances of vehicle occlusion). A processor (processing function 134) monitors this co-incident detection and is able to detect system degradation if the number or timing of detection events begins to deviate significantly amongst the multiple radar devices. As mentioned elsewhere herein, the cross checking redundancy provided by multiple radar devices detecting the same vehicles is a distinct improvement over buried inductive loop and magnetometer sensors, which have no ability to utilize multiple sensors in the same location to provide similar redundancies or comparative operation.

Other important aspects of the system 100 include the mechanisms by which vehicle detection signals are introduced to a variety of crossing controller devices 104 and relay circuits 106. System 100 is also configured, in embodiments, to provide information to railroad personnel or control centers 108 when system 100 detects lost system healthcheck signals 110 and/or radar healthcheck signals 112 or an unsatisfactorily high level of multiple radar detection anomalies, through a communications network 114.

Signals indicative of failed health checks (i.e., system healthcheck signals 110, radar healthcheck signals 112, etc. which issue a failsafe signal to the crossing controller devices or circuits or system level co-incident detection warnings may result in a performance log that a visiting operator or maintainer may examine. A more proactive and expedient means of alerting railroad personnel and operations to failed detectors or a degraded system is through the use of communications network 114 over which an alarm may be conveyed. Typical communication networks 114 and methods are contemplated and include wired or cellular wireless email, SMS text messaging, or proprietary web services.

Also anticipated is the future use of a comprehensive private communication network being deployed by the railroad industry for Positive Train Control or PTC. This system primarily uses a private 220 MHz radio network to communicate train location and infrastructure status to locomotives and to centralized dispatch centers.

Referring to system 100, radar control and data information are passed to and from the radar sensors 20, 22 via a radar communications interface 130. System further includes a power supply 132 operable for providing power to the components of system 100, a processing platform 134, a communications interface 136, for example, for one or more of cellular or PTC communications with railroad personnel or control centers 108, and a railroad equipment interface 138. Railroad equipment interface 138 provides control for the crossing controller devices 104 and relay circuits 106 and is the interface for reception of the system healthcheck signals 110 and radar healthcheck signals 112 described above. In embodiments, a communications converter 140 may be incorporated to provide a communications interface between system 100 and a configuration computer 150. In the illustrated embodiment, communications converter 140 provides an interface between the RS-485 interface utilized by the various components of system 100 and the RS-232 interface associated with configuration computer 150.

In operation, crossing gate controller devices detect the presence of oncoming trains and initiate crossing warning system operation. In the case of four quadrant gates, the exit gates are delayed several seconds to allow the crossing to clear, and then lowered. The detection of a vehicle within the crossing island 40 by the system 100 described herein is intended to forestall or reverse the exit gate descent providing an open gate situation in the lane(s) occupied by vehicle(s) and thereby allowing (if not encouraging) vehicles to exit the crossing island area without delay. To interface with integrated controllers or separate exit gate management systems, one or more 'lane occupied' signals and healthcheck signals are provided, typically in the form of solid state relay contacts. In embodiments, the lane occupied signals are the crossing controller device signals 104. Some crossing controller circuits are comprised of a series of relay devices rather than integrated controllers. Similarly, these controller circuits may utilize time delay relays, controlled by the same 'lane occupied' signals and health check signals provided by the system to more sophisticated controllers.

Once activated, a railroad crossing continues to operate as long as a key relay in the crossing control circuitry, the Crossing Relay (sometimes called XR) is in its active position. The crossing relay is initially controlled by a train detector circuit that is able to sense an oncoming train at a significant distance from the crossing. Once the train is on the crossing island itself, the train predictor circuit is no longer a part of the process. Instead, a shunt detection circuit monitoring the rails at the crossing island itself detects the metallic shunting of the rails caused by the metal wheels and axles of the train. When rails are dirty or contaminated by dirt, grain, coal dust and so forth, the wheels of some railroad cars (especially lighter weight empty cars) will cause insufficient shunting. As loss of conductivity between the rails occurs in these situations, the crossing gates will start to rise even though the train is still present. And as soon as conductivity is restored, the gates will return to a lowered position.

Accordingly, another use for system 100 involves radar-based detection of trains that pass through the crossing after the warning system process is completed. The radars can easily detect and classify the acutely chaotic radar signal returned by a passing train and provide a redundant signal to the crossing controller circuitry so that momentary dropouts of the electric shunt system do not cause this restarting and "pumping" of the crossing gates.

As described above, two or more FMCW Microwave radar sensors are mounted above the roadway and at the edge of the crossing island. The ideal mounting location is on top of the entrance gate mast between 18 and 22 feet above the roadway surface. The radars connect to a bungalow-mounted electronics assembly with a cable delivering power and RS-485 serial communications through which the radars communicate vehicle detection in their respective detection zones.

An equipment bungalow is generally associated with a rail grade crossing. In the equipment bungalow, an electronics assembly contains a power supply capable of isolating the 12 volt nominal power supply and converting it to the 15-28 volts required by the radar sensors 20, 22 and other modules.

At the point where the radar sensor's power/communication interface connects to system 100, specifically, to radar communications interface 130, isolation and surge protection are incorporated therein to protect system 100, typically located within the bungalow from lightning or other high potential surges that may be introduced through the elevated, exposed radar sensors.

In one embodiment, communications converter 140 is utilized to convert the radar sensors' and the electronics assembly's RS-485, multi-drop serial communications circuit, to an RS-232 circuit serial connection. This RS-232 serial interface is used by configuration computer 150 to allow configuration and verification of the radar's operating parameters. Alternatively, Ethernet links or wireless links, such as Bluetooth links may be utilized instead of or in addition to RS-232.

Over the RS-485 interface within system 100, processing platform 134 receives and monitors the radar sensors' health check signals. As stated in the foregoing, an absence of any individual radar sensor's health check is treated as a failure event, resulting in a signal to the crossing controller instructing it to revert to a failsafe state insofar as the position of the exit gates. Additionally, a failure of this nature triggers a communication event to alert railroad personnel and operating centers of the equipment problem, for example, via communications interface 136.

The processing platform 134 also monitors detection events from each radar device within each radar sensor 20, 22. Abnormally high discrepancies between what each radar 'sees' will also trigger an alert to notify railroad personnel and operating centers of the potential system problem, for example, via communications interface 136. The communications interface 136 and associated network (i.e., Cellular Radio Modem or PTC Radio (or Interface)) is used to communicate alarm information as stated above, as well as permitting remote verification and configuration of the system 100.

Railroad equipment controller interface 138 provides signals regarding lane-based vehicle detection and various health check signals which are delivered to the crossing controller equipment using a combination of isolated solid state relay circuits. Alternatively, an Ethernet link may be utilized as an interface between the vehicle detection electronics assembly and the crossing controller device.

The configuration computer 150 is temporarily connected to the system 100 via an RS-232 serial or other local link as described herein and is utilized to provide commands for setting up each radar sensor, including the multiple radar devices within each radar sensor thereby establishing detection zones and programming operating parameters into the processing platform 134.

Figure 4:
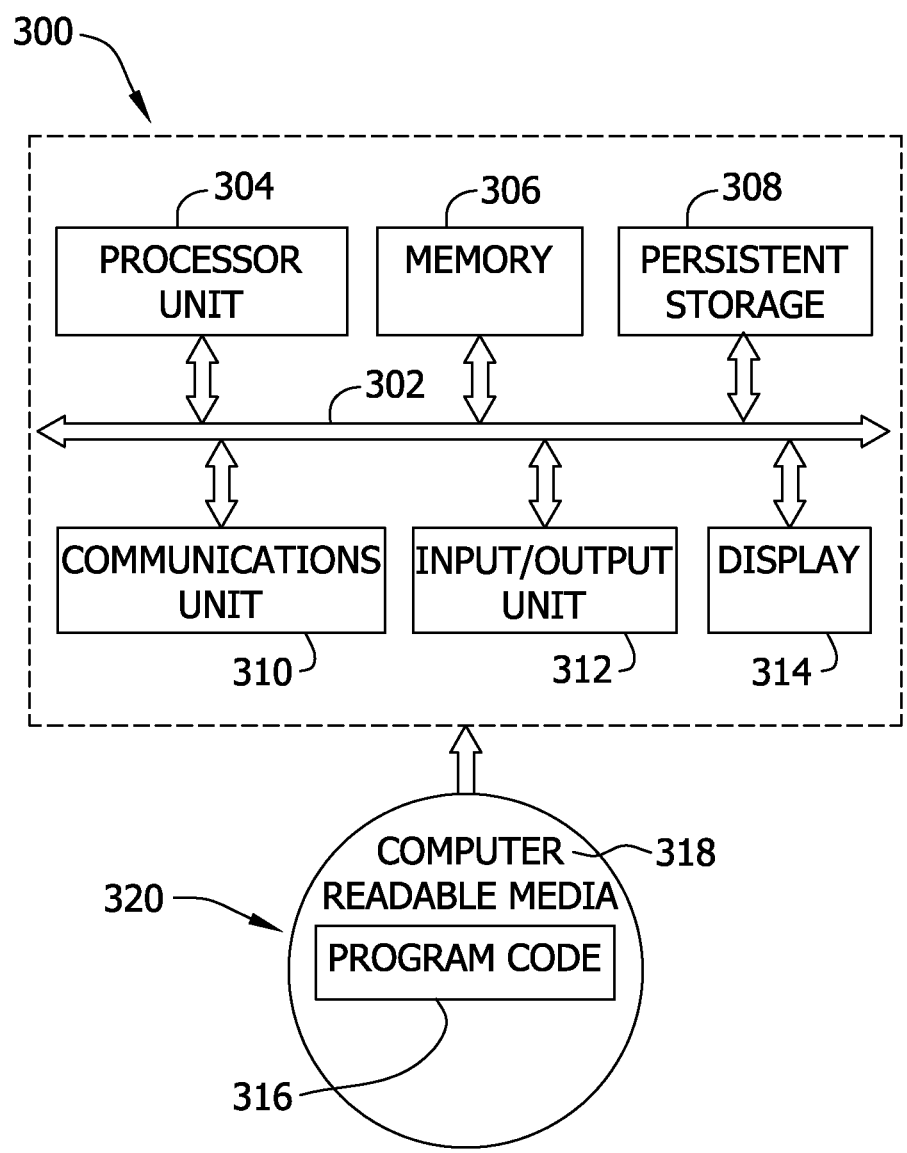
FIG. 4 is a diagram of a data processing system which may perform the processing functions of the system of FIG. 2.

Turning now to FIG. 4, a diagram of a data processing system is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314. Data processing system 300 is but one example of a processing system that could be utilized as processing platform 134. Similarly, data processing system 300 may be utilized as the architecture within configuration computer 150.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

Figure 5:
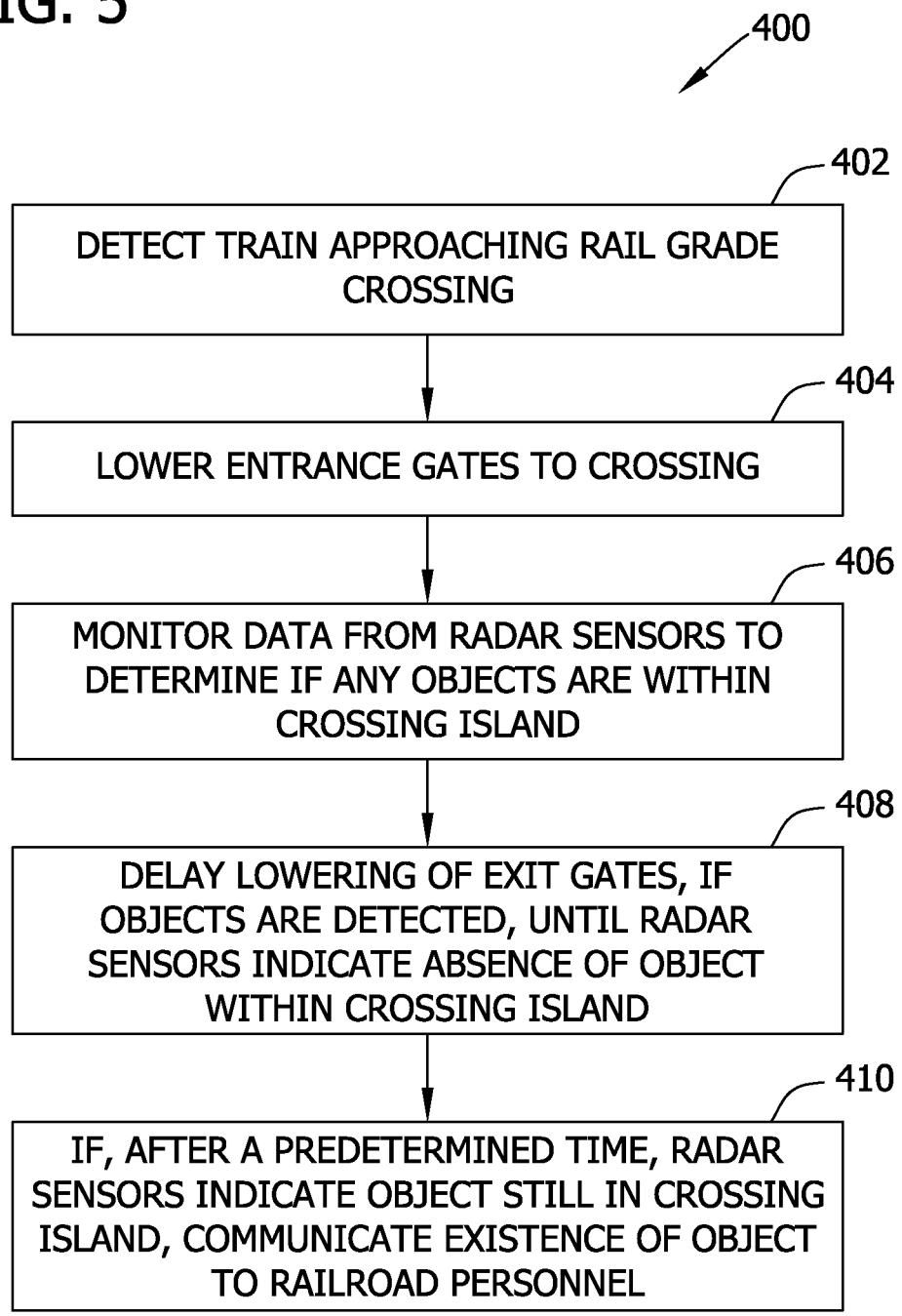
FIG. 5 is a flowchart illustrating operation of a radar sensor-based rail grade crossing.

The above described systems and rail grade crossing embodiments allow for a method of operating a radar sensor-based rail grade crossing as illustrated by the flowchart 400 of FIG. 5. As described herein, mechanisms exist for detection 402 of a train approaching a rail grade crossing. At an appropriate time, for example, based on a speed of the train and the distance from the crossing, the entrance gates are lowered 404, preventing objects (vehicles) from entering the crossing. Data from the radar sensors, as described above, is monitored 406, to determine if any objects are within the rail grade crossing island after the entrance have been lowered. If objects are detected by the radar sensors, lowering of any exit gates is delayed 408 until the radar sensors indicate an absence of objects within the crossing island. If, after a pre-determined time, the radar sensors indicate one or more objects are still within the crossing island, existence of the one or more objects is communicated 410 to railroad personnel.

Figure 6:
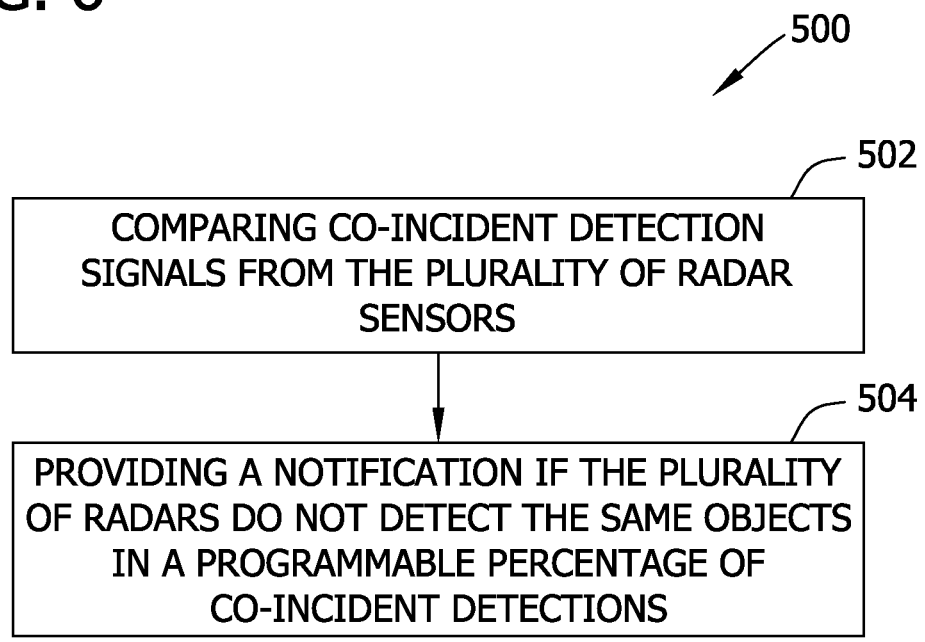
FIG. 6 is a flowchart illustrating a process for verifying operability of the radar sensors of FIG. 1.

FIG. 6 is a flowchart 500 illustrating a process for verifying operability of the radar sensors 20, 22 of FIGS. 1 and 2. More particularly, the process is a method for verifying operability of a plurality of radar sensors (and their individual radar devices) deployed for monitoring a portion of a rail grade crossing. The method includes comparing 502 co-incident detection signals from the plurality of radar sensors, and providing 504 a notification if the plurality of radar devices do not detect the same objects in a programmable percentage of co-incident detections. Providing 504 a notification, in one embodiment includes alerting railroad maintenance personnel to the possible degradation of detection capability of at least one of the radar sensors. The notification can take the form of, in embodiments, at least one of providing a log file for examination by personnel, providing a communication to personnel via a public cellular telephone network, providing a communication to personnel via at least one of a local area computer network and a wide area computer network, and providing a communication to personnel via a dedicated railroad communications network.

The comparing 502 includes comparing signals from the plurality of radars monitoring a detection zone within the rail grade crossing, and in embodiments, compensating the co-incident detection signals based on different physical perspectives of each radar sensor. As described above, in certain embodiments, each radar sensor includes a plurality of radar devices. In such embodiments, comparing 502 co-incident detection signals from the plurality of radar sensors refers to the monitoring of each portion of the rail grade crossing with at least one radar device from each radar sensor.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for sensing objects within a rail grade crossing island, said method comprising:
    transmitting a radar signal into the rail grade crossing island from each of a plurality of radar devices such that each portion of the rail grade crossing island is monitored by at least two of the radar devices;
    detecting an object in the rail grade crossing island based on received signals corresponding to the transmissions associated with a first one of the at least two radar devices;
    verifying whether a second one of the at least two radar devices also detected that the object is in the rail grade crossing island based on received signals corresponding to the transmissions associated with the second one of the at least two radar devices;
    providing an indication of system degradation if the detection of the object by the first one of the at least two radar devices deviates from the detection of the object by the second one of the at least two radar devices beyond a defined threshold; and operating a gate control device associated with the rail grade crossing based on the detection of the object in the rail grade crossing island.

2. The method according to claim 1 wherein operating the gate control device comprises opening an exit gate that allows the object to leave the rail grade crossing island.

3. The method according to claim 1 further comprising mounting the radar devices on a mast associated with crossing gates for the rail grade crossing island.

4. The method according to claim 1 wherein transmitting a radar signal into the rail grade crossing island from each of a plurality of radar devices comprises transmitting a frequency-modulated continuous wave (FMCW) from each of the plurality of radar devices.

5. The method according to claim 1 wherein detecting an object in the rail grade crossing island comprises compensating the received signals for detection of vehicles from different physical perspectives.

6. The method according to claim 1 wherein detecting an object comprises logically ORing the detection of the object by the first a one of the at least two radar devices and the second one of the at least two radar devices.

7. A crossing gate control system for a rail grade crossing island including vehicle traffic lanes, the system comprising:
at least two radar sensors comprising a plurality of radar devices therein, said at least two radar sensors respectively positioned such that each portion of the rail grade crossing island is monitored by at least two of the radar devices;
a processing device configured to receive signals from the at least two radar sensors; and
a railroad equipment interface communicatively coupled to said processing device and further coupled to one or more relays for operation of crossing gates associated with the rail grade crossing island, said railroad equipment interface operable to receive signals from said processing device related to operation of the one or more relays to forestall or reverse an exit crossing gate descent based on a detection of an object in the rail grade crossing island by one or more of the at least two radar sensors;
wherein each of said at least two radar sensors comprises a detection footprint that spans all of the vehicle lanes of the crossing island.

8. The crossing gate control system according to claim 7 wherein each of said at least two radar sensors defines a detection zone established within a detection footprint for a vehicle traffic lane associated with a respective exit gate, each of said at least two radar sensors comprising a similar detection zone so that detection events associated with said at least two radar sensors may be compared to one another.

9. The crossing gate control system according to claim 7 wherein each of said at least two radar sensors is mounted atop a respective entrance gate mast pole.

10. A method of operating a radar sensor-based rail grade crossing island including a plurality of radar sensors respectively having a plurality of radar devices, entrance gates and exit gates, the method comprising:
detecting a train approaching the rail grade crossing island;
lowering the entrance gates to the rail grade crossing island, based on a speed of the train approaching the rail grade crossing island and a distance of the train approaching the rail grade crossing island from the rail grade crossing island;
monitoring data from the plurality of radar sensors, after the entrance gates have been lowered to determine if any objects are within the rail grade crossing island by comparing co-incident detection signals from at least two of the radar devices;
if objects are detected by the radar sensors, delay lowering the exit gates until the radar sensors indicate an absence of objects within the rail grade crossing island; and
if, after a predetermined time, the radar sensors indicate one or more objects are still within the rail grade crossing island, communicate an existence of the one or more objects to railroad personnel.

11. The method according to claim 10 wherein communicating the existence of the one or more objects to railroad personnel comprises at least one of providing a log file for examination by the railroad personnel, providing a communication to railroad personnel via a public cellular telephone network, providing a communication to railroad personnel via at least one of a local area computer network and a wide area computer network, and providing a communication to railroad personnel via a dedicated railroad communications network.

12. The method according to claim 10 wherein monitoring data from the plurality of radar sensors comprises establishing a detection zone for each radar device within each radar sensor, at least one radar device within each radar sensor associated with each detection zone.

13. A method for verifying operability of a plurality of radar sensors deployed for monitoring a portion of a rail grade crossing, said method comprising:
comparing co-incident detection signals from the plurality of radar sensors; and
providing a notification if the plurality of radars do not detect the same objects in a programmable percentage of co-incident detections.

14. The method according to claim 13 wherein providing a notification comprises alerting railroad maintenance personnel to the possible degradation of detection capability of at least one of the radar sensors.

15. The method according to claim 13 wherein providing a notification comprises at least one of:
providing a log file for examination by personnel;
providing a communication to personnel via a public cellular telephone network;
providing a communication to personnel via at least one of a local area computer network and a wide area computer network; and
providing a communication to personnel via a dedicated railroad communications network.

16. The method according to claim 13 wherein comparing co-incident detection signals comprises comparing signals from the plurality of radars monitoring a detection zone within the rail grade crossing.

17. The method according to claim 13 wherein comparing co-incident detection signals comprises compensating the co-incident detection signals based on different physical perspectives of each radar sensor.

18. The method according to claim 13 wherein each radar sensor includes a plurality of radar devices, and wherein comparing co-incident detection signals from the plurality of radar sensors comprises monitoring each portion of the rail grade crossing with at least one radar device from each radar sensor.

19. A method of operating a radar sensor-based rail grade crossing island including a plurality of radar sensors respectively having a plurality of radar devices, entrance gates and exit gates, the method comprising:

establishing a detection zone for each radar device within each radar sensor, at least one radar device within each radar sensor associated with each detection zone;

detecting a train approaching the rail grade crossing island;

lowering the entrance gates to the rail grade crossing island, based on a speed of the train approaching the rail grade crossing island and a distance of the train approaching the rail grade crossing island from the rail grade crossing island;

monitoring data from the plurality of radar sensors, after the entrance gates have been lowered to determine if any objects are within the rail grade crossing island;

if objects are detected by the radar sensors, delay lowering the exit gates until the radar sensors indicate an absence of objects within the rail grade crossing island; and if, after a predetermined time, the radar sensors indicate one or more objects are still within the rail grade crossing island, communicate an existence of the one or more objects to railroad personnel.

20. The method according to claim 19, wherein monitoring data from the plurality of radar sensors comprises comparing co-incident detection signals from at least two of the radar devices.

\* \* \* \* \*